July 7, 1925.
T. D. FOLEY
COVER FOR SPARE TIRES
Filed Oct. 13, 1924
1,544,826
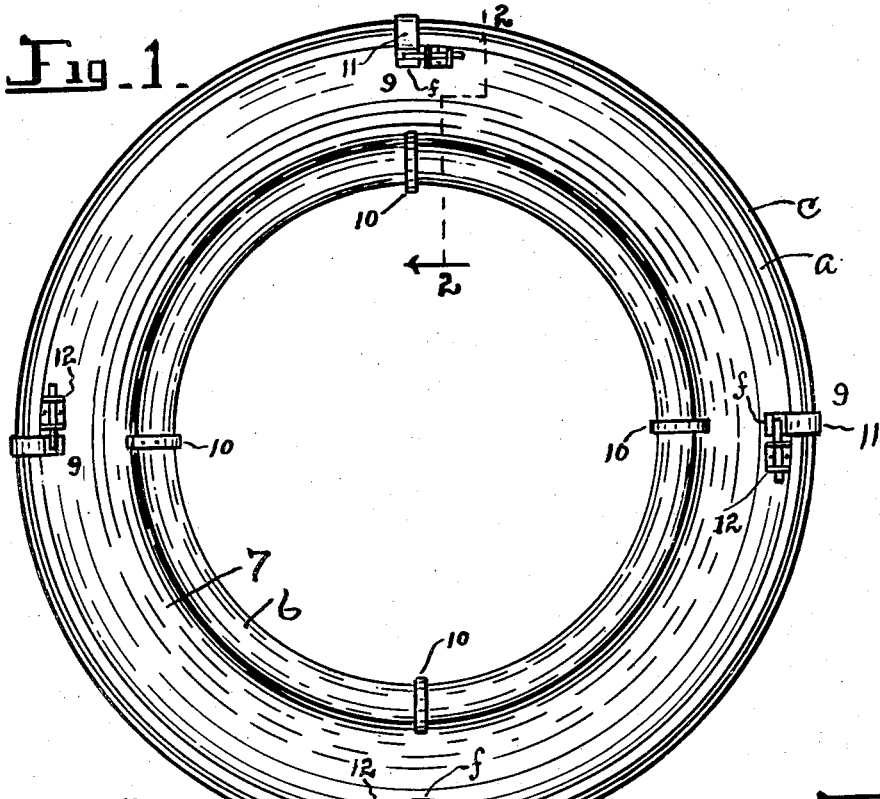
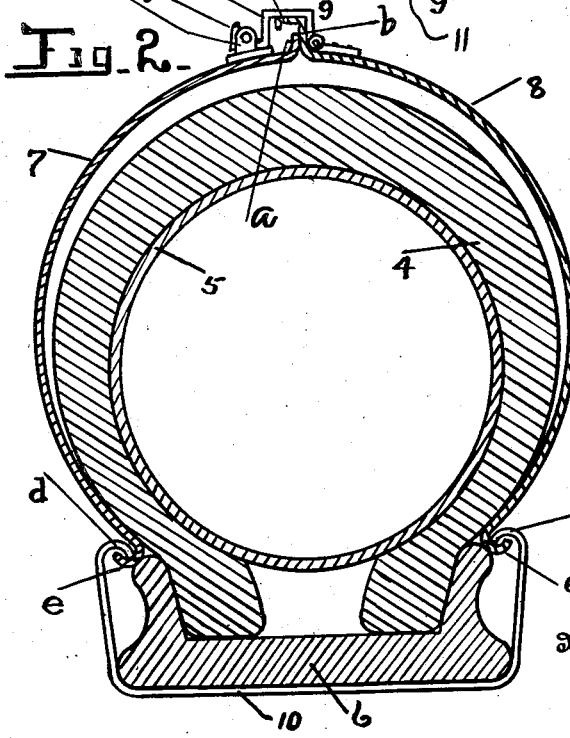
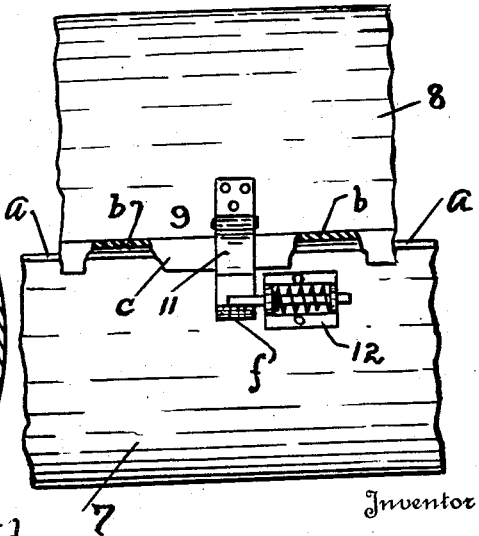
Inventor
Thomas D. Foley,
By Hiram A. Sturges
Attorney Patented July 7, 1925.

1,544,826

UNITED STATES PATENT OFFICE.

THOMAS D. FOLEY, OF OMAHA, NEBRASKA.

COVER FOR SPARE TIRES.

Application filed October 13, 1924. Serial No. 743,262.

*To all whom it may concern:*

Be it known that I, THOMAS D. FOLEY, a citizen of the United States, residing at Omaha, in the county of Douglas and State of Nebraska, have invented certain new and useful Improvements in a Cover for Spare Tires, of which the following is a specification.

This invention relates to covers for spare wheel-tires, said tires being carried by a vehicle ready for use in emergency cases and usually being secured in an upright position, and exposed to the weather, upon the running boards or upon the rear part of motor vehicles. The invention has for one of its objects to provide a cover which will be more convenient in use than ordinary and may be quickly applied to a tire or removed therefrom. Another object is to provide a cover which will effectively protect a tire from rain, dust, oil or moisture, and another object is to provide a cover which will be durable and will consist of few and simple parts so that it may be manufactured practically and at a minimum cost.

The invention consists of the novel and useful construction, combination and arrangement of parts as described herein and claimed, and as illustrated in the accompanying drawings, it being understood that changes may be made in form, size, proportion and minor details, said changes being determined by the scope of the invention as claimed.

In the drawings, Fig. 1 is a view in side elevation of a wheel tire with the cover thereon. Fig. 2 is a sectional view on an enlarged scale, on line 2—2 of Fig. 1. Fig. 3 is a broken away plan view showing the two parts of the cover and a fastening device therefor.

Referring now to the drawing, the invention is shown and described in connection with a tire casing 4, an inner or pneumatic tire 5 and a wheel-rim 6, these parts being of ordinary construction.

Since the tire mentioned is never used except in cases of emergency and is generally secured on a motor vehicle in the exposed position as stated, it is quite necessary to provide a cover therefor, to prevent injury which, eventually, might occur from action of rain, oil or dust.

For purposes of the invention, I provide a pair of circular side-caps indicated at 7 and 8, these preferably being constructed of sheet metal, their longitudinal and transverse curvatures conforming approximately to the shape of the tire, said members 7 and 8 being secured, opposite to each other, upon the tire by any suitable means, in such a manner that they may be quickly removed whenever the spare tire is required for use, said caps and fastening means to also be of such construction that the cover may be readily and conveniently applied to a tire; and it is particularly of importance that the inner edges of the side caps be pressed against the tire and against the wheel-rim so that water, oil or mud will be excluded and that injury to the tire may be prevented.

In the present embodiment of the invention I have shown fasteners 9 for connecting the outer edges of the opposed caps 7 and 8, and have shown fasteners 10 for connecting the inner edges of the caps, and while I have shown four fasteners 9 and four fasteners 10, I may, of course use a greater or lesser number, depending upon the size or weight of the tire, and upon the thickness of the sheet metal employed in the construction of the caps.

It will be seen that the cover thus mentioned may be readily and conveniently applied to a tire, the caps 7 and 8 being connected by use of the fasteners after the caps have been placed at the respective sides of the tire, and it will be appreciated that the cover may be quickly removed whenever the tire is needed for use.

In order that rain, oil or other foreign substances may be excluded, flanges $a$ and $b$ are provided for the respective members 7 and 8 at their outer edges, and when said members 7 and 8 have been applied to a tire, these flanges will be in engagement and will project outwardly of the tire. Also, preferably, member 8 is provided with a circular hood $c$ adapted to overhang said flanges, which tends to prevent any liquid or other substances from entering between the flanges $a$ and $b$.

The fastener 10 preferably consists of a comparatively narrow spring-loop having projections $d$ which extend inwardly for engaging in the circular grooves $e$ of members 7 and 8, and by referring to Fig. 2 of the drawings it will be noted that members 7 and 8 are of such form that the grooves $e$, at or near their inner edges, engage the rim 6. While I may use other fastening means I prefer the resilient bands 10 for the reason that they operate to advantage for pressing the inner parts of members 7 and 8 against the casing and against the rim 6 for excluding liquids or other substances from the casing or tire.

While I may use any suitable fastener as a substitute for the fastener 9 I have specifically shown for this purpose a hinge secured to member 8, said hinge having a wing 11 of angular form adapted to extend over the hood $c$, a spring catch 12 being mounted upon member 7, its bolt being adapted to engage a part of said wing 11 when the side caps 7 and 8 have been applied to a tire, said wing 11 preferably being provided with a projection $f$ for engaging the bolt of the spring catch 12, these parts being of such proportion that when the projections $f$ are engaged by said bolts, the flanges $a$ and $b$ will engage each other.

I claim as my invention,—

1. In a cover for a spare tire provided with a wheel rim, a pair of transversely curved, circular, metallic caps adapted to be disposed at the sides of a tire, fastening elements near the outer edges of the caps for connecting said caps one with the other, and fastening elements on the wheel rim in engagement with the caps near their inner edges for pressing said caps against the tire and wheel rim.

2. A cover for a spare tire, comprising a pair of longitudinally and transversely curved caps adapted to be disposed at the sides of a tire, each having an outwardly projecting flange at its outer edge and a groove at its inner edge, fastening elements on the caps having parts adapted to be disposed outwardly of said flanges for connecting said caps one with another, and resilient fastening elements engaging in the grooves of said caps for connecting the caps one with the other and for pressing said caps against the tire.

3. In a cover for a spare tire provided with a wheel rim, a pair of circular, transversely curved caps adapted to be disposed at the sides of a tire each having a groove at its inner edge, one of said caps having an outwardly projecting flange at its outer edge, the other cap of said pair at its outer edge having a transversely bent, circular hood, fastening elements on the caps including parts adapted to be disposed outwardly of the hood for connecting the caps one with the other and for maintaining the flange of a cap in the plane of said hood, and resilient fastening elements inwardly of the wheel rim engaging in the grooves of said caps for connecting said caps one with the other and for pressing said caps into engagement with the wheel rim and said tire.

In testimony whereof, I have affixed my signature in presence of two witnesses.

THOMAS D. FOLEY.

Witnesses:
 HIRAM A. STURGES,
 ARTHUR H. STURGES.